(12) United States Patent
Hwang et al.

(10) Patent No.: US 10,589,616 B2
(45) Date of Patent: Mar. 17, 2020

(54) POWER TRANSMISSION APPARATUS FOR VEHICLE

(71) Applicants: HYUNDAI MOTOR COMPANY, Seoul (KR); KIA MOTORS CORPORATION, Seoul (KR)

(72) Inventors: Seong Wook Hwang, Gunpo-si (KR); Seongwook Ji, Gunpo-si (KR); Ki Tae Kim, Incheon (KR); Ki Dong Kim, Anyang-si (KR); Hyun Sik Kwon, Seoul (KR); Cheol Ho Jang, Busan (KR); Soonki Eo, Ansan-si (KR); Kijong Park, Hwaseong-si (KR); Wonmin Cho, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 312 days.

(21) Appl. No.: 15/836,739

(22) Filed: Dec. 8, 2017

(65) Prior Publication Data
US 2019/0118636 A1    Apr. 25, 2019

(30) Foreign Application Priority Data
Oct. 25, 2017    (KR) .......................... 10-2017-0139145

(51) Int. Cl.
*F16H 3/54*    (2006.01)
*F16H 37/04*    (2006.01)
(Continued)

(52) U.S. Cl.
CPC ............... *B60K 6/365* (2013.01); *B60K 6/48* (2013.01); *F16H 3/006* (2013.01); *F16H 3/091* (2013.01);
(Continued)

(58) Field of Classification Search
CPC .. B60K 6/365; B60K 6/48; B60K 2006/4825; F16H 37/042; F16H 3/54; F16H 3/091;
(Continued)

(56) References Cited

U.S. PATENT DOCUMENTS 5,823,051 A    10/1998    Hall, III
9,409,473 B2    8/2016    Kaltenbach et al.
(Continued)

FOREIGN PATENT DOCUMENTS

DE    102011085199 A1    5/2013
KR    10-2017-0069741 A    6/2017

OTHER PUBLICATIONS

Extended European Search Report of corresponding European Patent Application No. 17206135.0—8 pages, (Jun. 12, 2018).

*Primary Examiner* — Jeffrey A Shapiro
(74) *Attorney, Agent, or Firm* — Morgan, Lewis & Bockius LLP

(57) ABSTRACT

A power transmission apparatus for a vehicle is disclosed. The power transmission apparatus includes three concentric input shafts, a transmitting shaft disposed on the peripheral circumference of a first one of the three input shafts without rotation interference, and a central shaft disposed in parallel with the first input shaft. The power transmission apparatus further includes a fixed transmission selectively shifting an input torque depending on the respective gear ratios of three change gear trains disposed between second and third input shafts, the transmitting shaft, and the central shaft. The power transmission apparatus further includes a composite transmission including one planetary gear set having a sun gear fixedly connected to one side of the transmitting shaft.

12 Claims, 8 Drawing Sheets

(51) Int. Cl.
    *F16H 37/06*      (2006.01)
    *B60K 6/365*      (2007.10)
    *F16H 3/00*       (2006.01)
    *F16H 3/091*      (2006.01)
    *B60K 6/48*       (2007.10)

(52) U.S. Cl.
    CPC ............ *F16H 3/54* (2013.01); *F16H 37/042* (2013.01); *F16H 37/046* (2013.01); *F16H 37/065* (2013.01); B60K 2006/4825 (2013.01); B60Y 2200/92 (2013.01); F16H 2200/0021 (2013.01); F16H 2200/0052 (2013.01); F16H 2200/0056 (2013.01); F16H 2200/2005 (2013.01); *F16H 2200/2033* (2013.01); *Y10S 903/91* (2013.01)

(58) Field of Classification Search
    CPC ...... F16H 3/006; F16H 37/065; F16H 37/046; F16H 200/0021; F16H 2200/2033; F16H 2200/2005; F16H 2200/0056; F16H 2200/0052; F16H 37/00; F16H 37/08; F16H 37/0806; F16H 37/0813; F16H 2720/04; Y10S 903/91
    See application file for complete search history.

(56) References Cited

U.S. PATENT DOCUMENTS

| | | |
|---|---|---|
| 2013/0109530 A1 | 5/2013 | Kaltenbach et al. |
| 2017/0166042 A1 | 6/2017 | Cho et al. |

FIG. 2

| SHIFT STAGE | CL1 | CL2 | CL3 | CL4 | SL | | |
|---|---|---|---|---|---|---|---|
| | | | | | D1 | N | D2 |
| REV | ● | | | ● | | | ● |
| FD1 | | ● | | ● | | ● | |
| FD2 | ● | | | ● | ● | | |
| FD3 | | | ● | ● | | ● | |
| FD4 | ● | | ● | | ● | | |
| FD5 | | ● | ● | | | ● | |
| FD6 | ● | | ● | | | | ● |

FIG. 4

| | SHIFT STAGE | ECL | CL1 | CL2 | CL3 | CL4 | SL | | |
|---|---|---|---|---|---|---|---|---|---|
| | | | | | | | D1 | N | D2 |
| ENGINE/ PARALLEL MODE | REV | ● | ● | | | ● | | | ● |
| | FD1 | ● | | ● | | ● | | ● | |
| | FD2 | ● | ● | | | ● | ● | | |
| | FD3 | ● | | | ● | ● | | ● | |
| | FD4 | ● | ● | | | ● | ● | | |
| | FD5 | ● | | ● | ● | | | ● | |
| | FD6 | ● | ● | | ● | | | | ● |
| EV MODE | REV | | ● | | | ● | | | ● |
| | FD1 | | | ● | | ● | | ● | |
| | FD2 | | ● | | | ● | ● | | |
| | FD3 | | | | ● | ● | | ● | |
| | FD4 | | ● | | ● | | ● | | |
| | FD5 | | | ● | ● | | | ● | |
| | FD6 | | ● | | ● | | | | ● |

FIG. 6

| SHIFT STAGE | CL1 | CL2 | CL3 | CL4 | BK | SL | | |
|---|---|---|---|---|---|---|---|---|
| | | | | | | D1 | N | D2 |
| REV | ● | | | ● | | | | ● |
| FD1 | | ● | | ● | | | ● | |
| FD2 | ● | | | ● | | ● | | |
| FD3 | | | ● | ● | | | ● | |
| FD4 | ● | | ● | | | ● | | |
| FD5 | | ● | ● | | | | ● | |
| FD6 | | | ● | | ● | | ● | |
| FD7 | ● | | ● | | | | | ● |

FIG. 8

| | SHIFT STAGE | ECL | CL1 | CL2 | CL3 | CL4 | BK | SL | | |
|---|---|---|---|---|---|---|---|---|---|---|
| | | | | | | | | D1 | N | D2 |
| ENGINE/ PARALLEL MODE | REV | ● | ● | | | ● | | | | ● |
| | FD1 | ● | | ● | | ● | | | ● | |
| | FD2 | ● | ● | | | ● | | ● | | |
| | FD3 | ● | | | ● | ● | | | ● | |
| | FD4 | ● | ● | | ● | | | ● | | |
| | FD5 | ● | | ● | | ● | | | ● | |
| | FD6 | ● | | | ● | | ● | | ● | |
| | FD7 | ● | ● | | ● | | | | | ● |
| EV MODE | REV | | ● | | | ● | | | | ● |
| | FD1 | | | ● | | ● | | | ● | |
| | FD2 | | ● | | | ● | | ● | | |
| | FD3 | | | | ● | ● | | | ● | |
| | FD4 | | ● | | ● | | | ● | | |
| | FD5 | | | ● | ● | | | | ● | |
| | FD6 | | | | ● | | ● | | ● | |
| | FD7 | | ● | | ● | | | | | ● |

POWER TRANSMISSION APPARATUS FOR VEHICLE

CROSS-REFERENCE TO RELATED APPLICATION

This application claims priority to and the benefit of Korean Patent Application No. 10-2017-0139145 filed in the Korean Intellectual Property Office on Oct. 25, 2017, the entire contents of which are incorporated herein by reference.

BACKGROUND

(a) Field

The present disclosure relates to a power transmission apparatus for a vehicle. More particularly, the present disclosure relates to a power transmission apparatus for a vehicle capable of implementing multiple fixed shift stages using one synchronize and one planetary gear set and enabling driving in an electric vehicle (EV) mode or a parallel hybrid mode by additionally disposing one motor/generator.

(b) Description of the Related Art

Environmentally-friendly technology in a vehicle is a key to survival for the future vehicle industry, and automakers have made every effort to develop environmentally-friendly vehicles for accomplishing environment and fuel consumption regulations.

An example of the future vehicle technology may include an electric vehicle (EV) and a hybrid electric vehicle (HEV) that use electric energy and a dual clutch transmission (DCT) that has improved efficiency and convenience.

The above information disclosed in this Background section is only for enhancement of understanding of background of the invention. Applicant notes that this section may contain information available before this application. However, by providing this section, Applicant does not admit that any information contained in this section constitutes prior art.

SUMMARY

A DCT includes two clutch devices in an automatic transmission and a gear train of a basic manual transmission, selectively transfers a torque input from an engine to two input shafts using two clutches, shifts the torque using the gear train described above, and outputs the shifted torque.

The DCT has been attempted in order to compactly implement a high shift stage transmission of 5 shift stages or more, and has been implemented as an auto manual transmission (AMT) that makes a manual shift of a driver unnecessary by controlling the two clutches and synchronizing devices by a controller.

Therefore, since the DCT may comply with importance of implementation efficiency of more shift stages and a fuel consumption regulation due to advantages such as power transfer efficiency more excellent than that of a planetary gear-type automatic transmission and easiness of replacement and addition of components depending on implementation of more shift stages, the DCT has been prominent The disclosure has been made in an effort to provide a power transmission apparatus for a vehicle having advantages of implementing multiple fixed shift stages using one synchronize and one planetary gear set and enabling driving in an electric vehicle mode or a parallel hybrid mode by additionally disposing one motor/generator.

Further, the present disclosure has been made in an effort to provide a power transmission apparatus for a vehicle having advantages of simplifying an internal configuration through a reduction in the number of components, improving fuel consumption through minimization of a weight, and improving mountability through a reduction in a volume by using only one synchronizer.

An embodiment of the present invention provides a power transmission apparatus for a vehicle, including: a first input shaft fixedly connected to an output side of an engine: a second input shaft formed of a hollow shaft, disposed on an outer circumference of the first input shaft without rotation interference to overlap the first input shaft, and selectively connected to the first input shaft through a first clutch; a third input shaft formed of a hollow shaft, disposed on an outer circumference of the second input shaft without rotation interference to overlap the second input shaft, and selectively connected to the first input shaft through a second clutch; a transmitting shaft disposed on the peripheral circumference of the first input shaft without rotation interference to correspond to a front side of the second input shaft; a central shaft disposed in parallel with the first input shaft in a state in which the central shaft is spaced apart from the first input shaft by a predetermined interval; a fixed transmission selectively shifting an input torque depending on the respective gear ratios of three change gear trains disposed between the second and third input shafts, the transmitting shaft, and the central shaft and each having drive gears and driven gears externally connected to each other and outputting the shifted torque through the central shaft and the transmitting shaft; a composite transmission including one planetary gear set having a sun gear fixedly connected to one side of the transmitting shaft, a planetary carrier selectively connected to the first input shaft connected through a third clutch, and a ring gear selectively connected to the central shaft to shift input torques and output the shifted torque; and an output shaft disposed in parallel with the first input shaft in a state in which the output shaft is spaced apart from the first input shaft by a predetermined interval and outputting the torque transferred from the composite transmission to a final reduction gear.

The first and second clutches, the fixed transmission, and the composite transmission may be disposed in a sequence of the composite transmission, the fixed transmission, the second clutch, and the first clutch behind the engine.

The three change gear trains may include: a first change gear train including a first drive gear fixedly connected to the transmitting shaft and a first driven gear fixedly connected to the central shaft and externally connected to the first drive gear; a second change gear train including a second drive gear disposed on the outer circumference of the second input shaft without rotation interference, a second driven gear fixedly connected to the central shaft, and an idle gear externally connecting the second drive gear and the second driven gear to each other; and a third change gear train including a third drive gear fixedly connected to the third input shaft and a third driven gear fixedly connected to the central shaft and externally connected to the third drive gear.

The first drive gear and the second drive gear may be selectively synchronously connected to the second input shaft by a synchronizer.

The first change gear train may have a gear ratio for forward 2-speed and 4-speed, the second change gear train may have a gear ratio for forward 6-speed and reverse, and the third change gear train may have a gear ratio for forward 1-speed and 5-speed.

In the composite transmission, the sun gear of the planetary gear set maybe fixedly connected to the transmitting shaft, the planetary carrier gear of the planetary gear set may be selectively connected to the first input shaft, and the ring gear of the planetary gear set may have a central output gear integrally therewith on an outer circumference thereof, and the central output gear may be externally connected between a central drive gear disposed on the central shaft without rotation interference and selectively connected to the central shaft through a fourth clutch and a central input gear on the output shaft.

The composite transmission may output a torque selectively transferred through the central drive gear on the central shaft to the central input gear on the output shaft through the central output gear on the ring gear at it is, and may shift a torque selectively input from the first input shaft to the planetary carrier and the torque shifted from the fixed transmission and input to the sun gear through the transmitting shaft and output the shifted torque to the central input gear on the output shaft through the central output gear.

The planetary gear set may be a single pinion planetary gear set.

A motor/generator may be connected to the first input shaft in series, and be selectively connected to the output side of the engine through an engine clutch.

The transmitting shaft may be selectively connected to a transmission housing through a brake.

The first change gear train may have a gear ratio for forward 2-speed and 4-speed, the second change gear train may have a gear ratio for forward 7-speed and reverse, and the third change gear train may have a gear ratio for forward 1-speed and 5-speed.

BRIEF DESCRIPTION OF THE DRAWINGS

FIG. 2 is a shift operation table of the power transmission apparatus for a vehicle according to a first embodiment of the present invention.

FIG. 4 is a shift operation table of the power transmission apparatus for a vehicle according to a second embodiment of the present invention.

FIG. 6 is a shift operation table of the power transmission apparatus for a vehicle according to a third embodiment of the present invention.

FIG. 8 is a shift operation table of the power transmission apparatus for a vehicle according to a fourth embodiment of the present invention.

DETAILED DESCRIPTION

Figure 1:
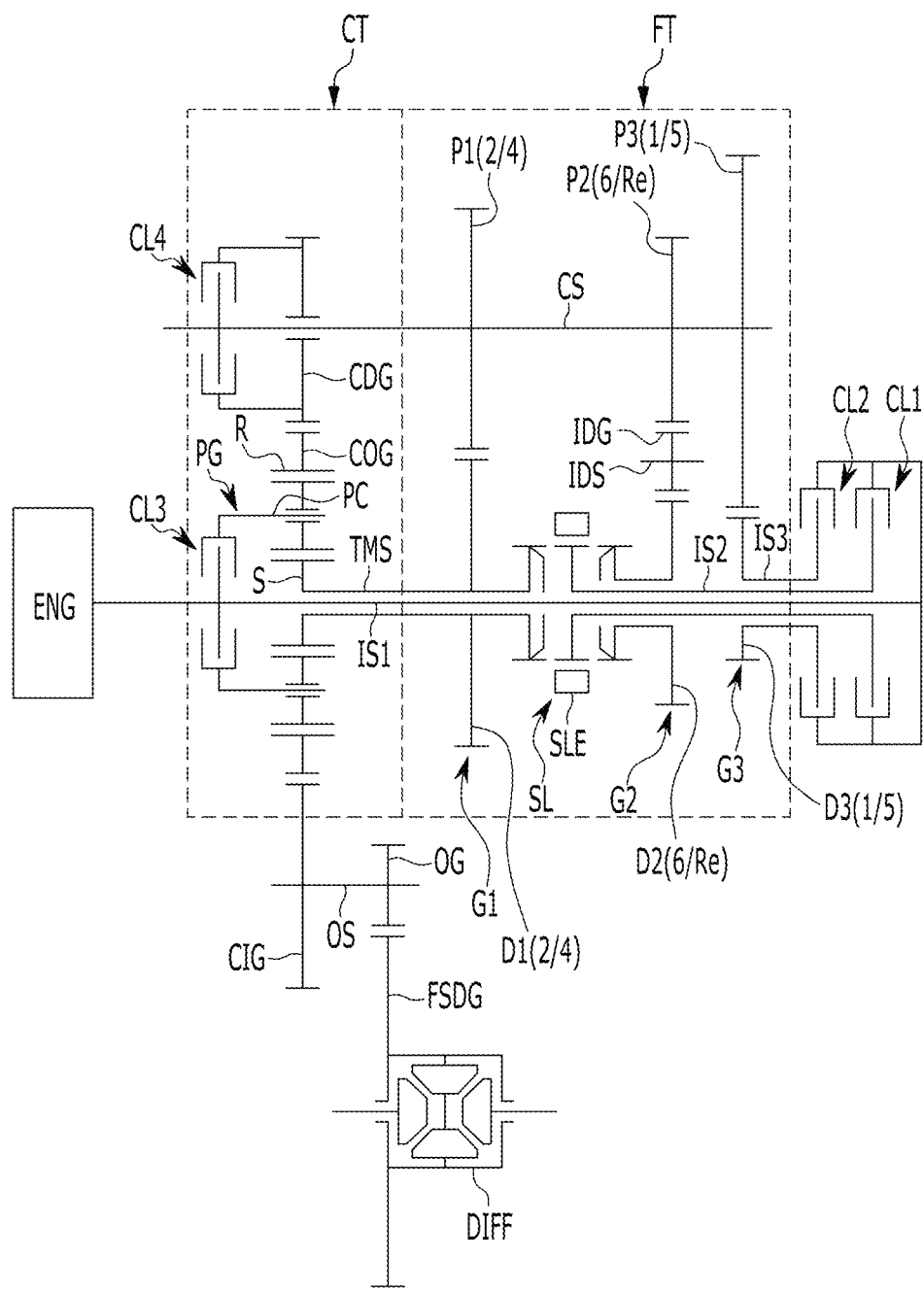
FIG. 1 is a configuration diagram of a power transmission apparatus for a vehicle according to a first embodiment of the present invention.

Embodiments of the present invention will be described more fully hereinafter with reference to the accompanying drawings. As those skilled in the art would realize, the described embodiments may be modified in various different ways, all without departing from the spirit or scope of the present invention.

Similar reference numerals will be used to describe the same or similar portions throughout the specification.

In the following description, dividing names of components into first, second and the like is to divide the names because the names of the components are the same as each other and an order thereof is not particularly limited.

In embodiments, when two members (elements) are fixedly connected with a shaft, the two members move together and rotate about a rotational axis at the same angular speed. In embodiments, when a member is fixedly connected to a transmission housing, the member is fixed to the transmission housing and does not rotate about a rotational axis of the transmission. In embodiments, when two members are fixedly connected each other and when one of the two members is fixedly connected to a transmission housing, the two fixedly connected members are fixed to the transmission housing and do not rotate about a rotational axis of the transmission. In embodiments, the term "fixedly connected" is interchangeable with the term "fixed to".

In embodiments, when two members are "selectively connected", the two members are operable (1) to engage (fixedly connected) each other to move/rotate together for an operation of the transmission or (2) not to engage each other and to move independently for another operation of the transmission. In embodiment, the term "selectively connected" is interchangeable with the term "connect or disconnect". In embodiment, when a member is engaged to a transmission housing, the member is fixed to the transmission housing, and does not rotate about a rotational axis of a transmission.

In embodiments, when two members are "synchronously connected" using a synchronizer, the two members are operable to (1) rotate together at the same angular speed when the synchronizer operates to engage/synchronize the two members or (2) to rotate at two different angular speed when the synchronizer does not operate to engage/synchronize the two members.

In embodiments, when a clutch operates, the clutch engages two rotatable members (axes) corresponding to the clutch such that the members rotate together at the same angular speed.

FIG. 1 is a configuration diagram of a power transmission apparatus for a vehicle according to a first embodiment of the present invention.

Referring to FIG. 1, the power transmission apparatus for a vehicle according to a first embodiment of the present invention includes first, second, and third input shafts IS1, IS2, and IS3, a transmitting shaft TMS, a central shaft CS, a fixed transmission FT, a composite transmission CT, and an output shaft OS.

Therefore, when a torque of an engine ENG, which is a power source, is shifted in the fixed transmission FT, the composite transmission CT shifts a torque in a reduced or increased gear ratio by a complementary operation between the shifted torque transferred from the fixed transmission FT and the torque selectively transferred from the engine ENG, and outputs the shifted torque, such that shift stages of forward six speeds and reverse one speed are implemented.

As the engine ENG which is the power source, various known engines such as an existing gasoline engine, diesel engine, or the like, using a fossil fuel may be used.

The torque generated from the engine ENG is input through the power transmission apparatus for a vehicle through the first input shaft IS1, and the torque of the first input shaft IS1 is transferred to the composite transmission CT by a selective operation of a third clutch CL3 simultaneously with being input to the fixed transmission FT through the second and third input shafts IS2 and IS3 by selective operations of first and second clutches CL1 and CL2.

In addition, for the purpose of the torque flow as described above, the composite transmission CT, the fixed transmission FT, the second clutch CL2, and the first clutch CL1 are sequentially disposed in series behind the engine ENG.

The first input shaft IS1 is directly connected to an output side of the engine ENG to selectively transfer the torque of the engine ENG to the composite transmission CT.

The second input shaft IS2 is formed of a hollow shaft, is disposed on an outer circumference of the first input shaft IS1 without rotation interference, and is connected to the first input shaft IS1 through the first clutch CL1 disposed at a rear end portion of the first input shaft IS1 to selectively transfer the torque of the engine ENG to the fixed transmission FT.

The third input shaft IS3 is formed of a hollow shaft, is disposed on an outer circumference of the second input shaft IS2 without rotation interference, and is connected to the first input shaft IS1 through the second clutch CL2 disposed at the rear end portion of the first input shaft IS1 to selectively transfer the torque of the engine ENG to the composite transmission CT.

The transmitting shaft TMS is disposed on the peripheral circumference of the first input shaft IS1 without rotation interference to correspond to a front side of the second input shaft IS2.

In addition, the central shaft CS is disposed in parallel with the first input shaft IS1 in a state in which it is spaced apart from the first input shaft IS1 by a predetermined interval.

A central drive gear CDG is disposed on the central shaft CS without rotation interference, and is selectively connected to the central shaft CS through a fourth clutch CL4.

The fixed transmission FT includes first, second, and third change gear trains G1, G2, and G3 disposed between the second and third input shafts IS2 and IS3, the transmitting shaft TMS, and the central shaft CS and each having drive gears and driven gears externally connected to each other, and selectively shifts the torque depending on the respective gear ratios of the respective change gear trains G1, G2, and G3, and outputs the shifted torque through the central shaft CS and the transmitting shaft TMS.

The first change gear train G1 includes a first drive gear D1 fixedly formed integrally with the transmitting shaft TMS disposed on the outer circumference of the first input shaft IS1 without the rotation interference and a first driven gear P1 fixedly formed integrally with the central shaft CS and externally connected to the first drive gear D1.

The second change gear train G2 includes a second drive gear D2 disposed on the outer circumference of the second input shaft IS2 without rotation interference, a second driven gear P2 fixedly formed integrally with the central shaft CS, and an idle gear IDG configured on an idle shaft IDS disposed between the second drive gear D2 and the second driven gear P2 and externally connected to each of the second drive gear D2 and the second driven gear P2.

Here, a synchronizer SL is disposed between the first drive gear D1 and the second drive gear D2 to selectively synchronously connect the first drive gear D1 and the second drive gear D2 to the second input shaft IS2.

The third change gear train G3 includes a third drive gear D3 fixedly formed integrally with the third input shaft IS3 and a third driven gear P3 fixedly formed integrally with the central shaft CS and externally connected to the third drive gear D3.

The meaning that the fixed transmission FT is configured to include the three change gear trains G1, G2, and G3 as described above is that three fixed shift stags may be implemented, and gear ratios for the respective drive gears and driven gears forming the three change gear trains G1, G2, and G3 may be changed depending on a required design condition of a transmission.

In a first embodiment of the present invention, a case in which the first change gear train G1 has a gear ratio for a shift of 2-speed and 4-speed, the second change gear train G2 has a gear ratio for a shift of 6-speed and reverse, and the third change gear train G3 a gear ratio for a shift of 1-speed and 5-speed is illustrated by way of example.

Therefore, the first and second change gear trains G1 and G2 receiving and shifting a torque of the second input shaft IS2 may implement even shift stages of forward 2-speed, 4-speed, and 6-speed and a reverse shift stage Re, and the third change gear train G3 receiving and shifting a torque of the third input shaft IS3 may implement odd shift stages of forward 1-speed and 5-speed.

Through the configuration as described above, in the fixed transmission FT, the torque shifted through the three change gear trains G1, G2, and G3 is output to the composite transmission CT through two paths. Here, one of the two paths is a path through the central shaft CS, and the other of the two paths is a path through the transmitting shaft TMS.

Here, since the synchronizer SL is the known component, a detailed description therefor will be omitted, a sleeve SLE used in the synchronizer SL includes a separate actuator as known, and the actuator perform a shift while being controlled by a transmission control unit.

The composite transmission CT is disposed between the engine ENG and the fixed transmission FT, and includes one planetary gear set PG having a sun gear S fixedly connected to one side of the transmitting shaft TMS to the input torques and output the shifted torque.

The planetary gear set PG, which is a single pinion planetary gear set, includes the sun gear S fixedly connected to a front end of the transmitting shaft TMS disposed on the first input shaft IS1 without rotation interference, a planet carrier PC rotatably supporting a plurality of pinion gears externally engaged with the sun gear S, and a ring gear R internally engaged with the plurality of pinion gears.

That is, the sun gear S is fixedly connected to the transmitting shaft TMS, the planetary carrier PC is selectively connected to the first input shaft IS1 through the third clutch CL3, and the ring gear(R) has a central output gear COG integrally therewith on an outer circumference thereof.

Here, the central output gear COG is externally connected to the central drive gear CDG on the central shaft CS, and is externally connected to a central input gear CIG fixedly connected to the output shaft OS.

The output shaft OS is disposed in parallel with the first input shaft IS1 in a state in which it is spaced apart from the first input shaft IS1 by a predetermined interval, and has the central input gear CIG fixedly formed at one side thereof and externally connected to the central output gear DOG to output the torque transferred from the composite transmission CT to a final reduction gear FSDG.

That is, the output shaft OS has a final output gear OG formed integrally therewith at one end portion thereof, and the final output gear OG is externally connected to the final reduction gear FSDG of a differential DIFF.

Here, the third clutch CL3 is disposed to selectively connect the first input shaft IS1 and the planetary carrier PC to each other, and the fourth clutch CL4 is disposed to selectively connect the central shaft CS and the central drive gear CDG to each other.

Through the configuration described above, the composite transmission CT may output the torque transferred from the central drive gear CDG on the central shaft CS to the central output gear COG on the output shaft OS at it is.

In addition, in the composite transmission CT, in a state in which the torque is not input from the fixed transmission FT to the composite transmission CT, in the case in which the torque of the engine ENG is input to the composite transmission CT through the planetary carrier PC by an operation control of the third clutch CL3, such that the fourth clutch CL4 is controlled to be operated, the planetary gear set PG, the first change gear train G1, and the central shaft CS form one power transfer path having a closed circuit form, such that the torques may be complementarily operated and be compositely shifted depending on a gear ratio of the first change gear train G1 and a gear ratio between the central drive gear CDG and the central output gear COG and be then output.

In addition, in a state in which the torque of the engine ENG is input through the planetary carrier PC by an operation control of the third clutch CL3, the torque may be shifted and output by differential operations depending on rotation conditions (forward rotation, fixing, reverse rotation, and the like) of the sun gear.

Here, the first, second, third and fourth clutches C1, C2, C3, and C4, which are friction mechanisms, are hydraulic friction coupling units operated by a hydraulic pressure supplied by a hydraulic control apparatus, and are mainly multi-plate wet hydraulic friction coupling units, but may be coupling units that may be operated depending on electrical signals supplied from an electronic control apparatus, such as multi-plate dry clutches.

FIG. 2 is a shift operation table of the power transmission apparatus for a vehicle according to a first embodiment of the present invention, and shift processes will be described with reference to FIG. 2.

[Reverse]

In a reverse shift stage REV, as shown in FIG. 2, the second drive gear D2 and the second input shaft IS2 are synchronously connected to each other through the sleeve SLE of the synchronizer SL, and the first clutch CL1 and the fourth clutch CL4 are operated.

Therefore, the torque of engine ENG is output to the final reduction gear FSDG of the differential DIFF through the first input shaft IS1, the first clutch CL1, the second input shaft IS2, the second drive gear D2, the idle gear IDG, the second driven gear P2, the central shaft CS, the fourth clutch CL4, the central drive gear CDG, the central output gear COG, the central input gear CIG, the output shaft OS, and the final output gear OG in a reverse rotation direction, such that reverse driving is performed.

[Forward 1-Speed]

In forward 1-speed FD1, as shown in FIG. 2, the second clutch CL2 and the fourth clutch CL4 are operated in a state in which the sleeve SLE of the synchronizer SL is put in a neutral position.

Therefore, the torque of engine ENG is transferred to the final reduction gear FSDG of the differential DIFF through the first input shaft IS1, the second clutch CL2, the third input shaft IS3, the third drive gear D3, the third driven gear P3, the central shaft CS, the fourth clutch CL4, the central drive gear CDG, the central output gear COG, the central input gear CIG, the output shaft OS, and the final output gear OG, such that forward 1-speed driving is performed.

[Forward 2-Speed]

In forward 2-speed FD2, as shown in FIG. 2, the first drive gear D1 and the second input shaft IS2 are synchronously connected to each other through the sleeve SLE of the synchronizer SL, and the first clutch CL1 and the fourth clutch CL4 are operated.

Therefore, the torque of engine ENG is transferred to the final reduction gear FSDG of the differential DIFF through the first input shaft IS1, the first clutch CL1, the second input shaft IS2, the first drive gear D1, the first driven gear P1, the central shaft CS, the fourth clutch CL4, the central drive gear CDG, the central output gear COG, the central input gear CIG, the output shaft OS, and the final output gear OG, such that forward 2-speed driving is performed.

[Forward 3-Speed]

In forward 3-speed FD3, as shown in FIG. 2, the third clutch CL3 and the fourth clutch CL4 are operated in a state in which the sleeve SLE of the synchronizer SL is put in a neutral position.

Therefore, the central drive gear CDG and the central shaft CS are synchronously connected to each other by the operation of the fourth clutch CL4 in a state in which the torque of the engine ENG is directly input the planetary carrier PC of the planetary gear set PG constituting the composite transmission CT through the first input shaft IS1 and the third clutch CL3.

In this case, in the planetary gear set PG, in a state in which the torque of the engine is input to the planetary carrier PC, the torques are complementarily operated and compositely output depending on a gear ratio between the central output gear COG and the central drive gear CDG and a gear ratio between the first drive gear D1 and the first driven gear P1, and are then transferred to the final reduction gear FSDG of the differential DIFF through the final output gear OG of the output shaft OS, such that forward 3-speed driving is performed.

[Forward 4-Speed]

In forward 4-speed FD4, as shown in FIG. 2, the first drive gear D1 and the second input shaft IS2 are synchronously connected to each other through the sleeve SLE of the synchronizer SL, and the first clutch CL1 and the third clutch CL3 are operated.

Therefore, some of the torque of the engine ENG is input to the sun gear S of the planetary gear set PG through the first input shaft IS1, the first clutch CL1, the second input shaft IS2, the first drive gear D1, and the transmitting shaft TMS, and the other of the torque of the engine ENG is input to the planetary carrier PC of the planetary gear set PG through the first input shaft IS1 and the third clutch CL3.

In this case, the entire planetary gear set PG becomes a state in which it integrally rotates. Therefore, the input torque is output to the central output gear COG as it is, and is then transferred to the final reduction gear FSDG of the differential DIFF through the central input gear CIG, the output shaft OS, and the final output gear OG, such that forward 4-speed driving is performed.

[Forward 5-Speed]

In forward 5-speed FD5, as shown in FIG. 2, the second clutch CL2 and the third clutch CL3 are operated in a state in which the sleeve SLE of the synchronizer SL is put in a neutral position.

Therefore, some of the torque of the engine ENG is reduced through the first input shaft IS1, the second clutch CL2, the third input shaft IS3, the third drive gear D3, the third driven gear P3, the central shaft CS, the first driven gear P1, the first drive gear D1, and the transmitting shaft TMS and is then input to the sun gear S of the planetary gear set PG constituting the composite transmission CT, and the other of the torque of the engine ENG is directly input to the planetary carrier PC of the planetary gear set PG constituting the composite transmission CT through the first input shaft IS1 and the third clutch CL3.

In this case, in the planetary gear set SG of the composite transmission CT, since the torques having different rotation speeds are input to the sun gear S and the planetary carrier PC, the torque is shifted to be increased depending on a difference between the rotation speeds, and is then output to the final reduction gear FSDG of the differential DIFF through the central output gear COG formed integrally with the ring gear R, the central input gear CIG, the output shaft OS, and the final output gear OG, such that forward 5-speed driving is performed.

[Forward 6-Speed]

In forward 6-speed FD6, as shown in FIG. 2, the second drive gear D2 and the second input shaft IS2 are synchronously connected to each other through the sleeve SLE of the synchronizer SL, and the first clutch CL1 and the third clutch CL3 are operated.

Therefore, some of the torque of the engine ENG passes through the first input shaft IS1, the first clutch CL1, the second input shaft IS2, the second drive gear D2, the idle gear (IDG), and the second driven gear P2 and then rotates the central shaft CS in a forward rotation direction, the torque rotating the central shaft CS in the forward rotation direction is input the sun gear S of the planetary gear set PG constituting the composite transmission CT through the first driven gear P1 and the first drive gear D1 in a reverse rotation direction, and the other of the torque of the engine ENG is directly input to the planetary carrier PC of the planetary gear set PG constituting the composite transmission CT through the first input shaft IS1 and the third clutch CL3 in the forward rotation direction.

In this case, in the planetary gear set PG of the composite transmission CT, the torque is shifted to be significantly increased by the sun gear S rotating in the reverse rotation direction and the planetary carrier PC rotating in the forward rotation direction, and is then output to the final reduction gear FSDG of the differential DIFF through the central output gear COG formed integrally with the ring gear R, the central input gear CIG, the output shaft OS, and the final output gear OG, such that forward 6-speed driving, which is the highest forward shift stage, is performed.

In the description of the shift processes as described above, only current operation states of the respective shift stages are described, and when sequential shifts up to higher shift stages are performed, synchronizers associated with the next higher shift stages may be preliminarily operated and when sequential shifts up to lower shift stages are performed, synchronizers associated with the next lower shift stages may be preliminarily operated.

Figure 3:
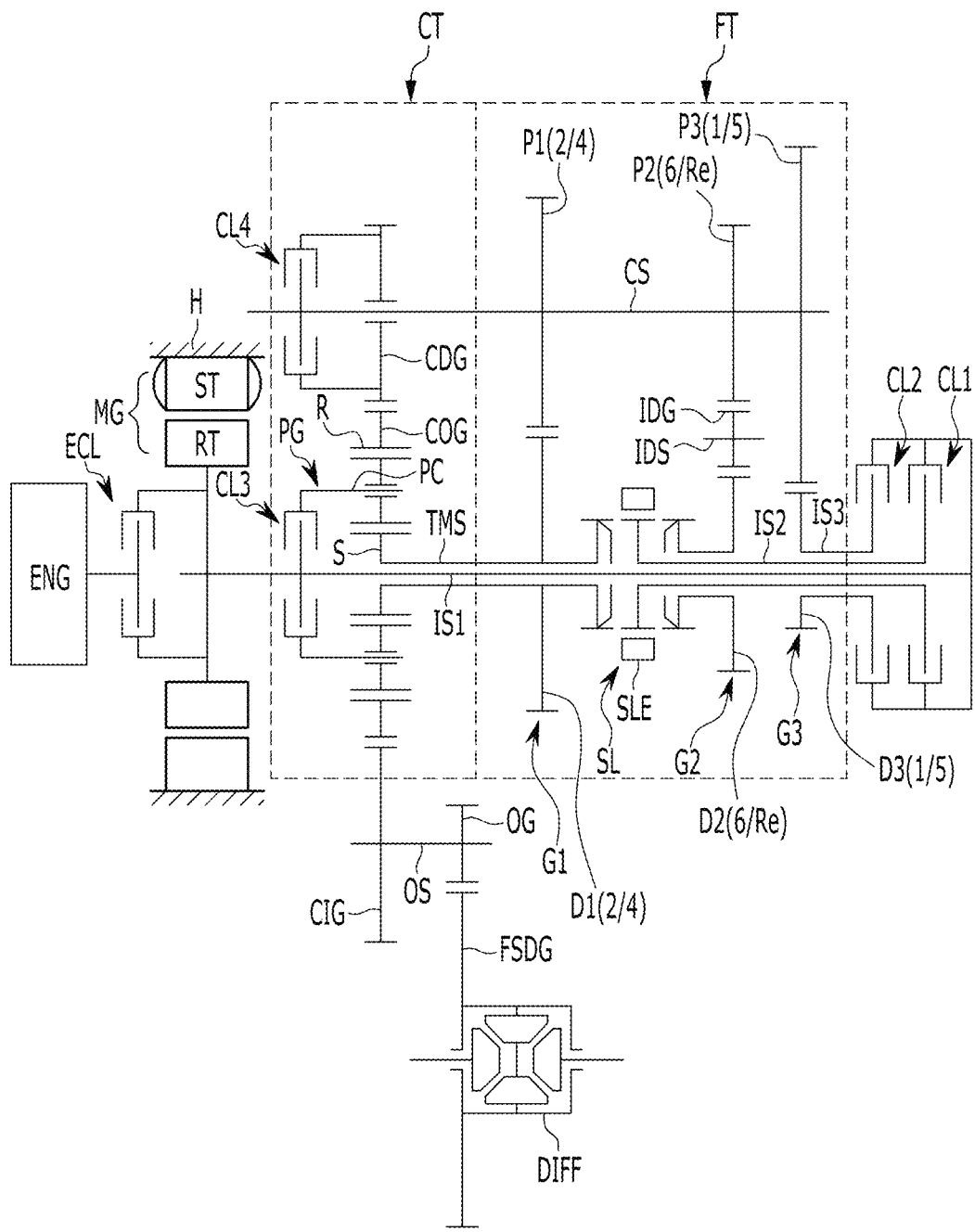
FIG. 3 is a configuration diagram of a power transmission apparatus for a vehicle according to a second embodiment of the present invention.

FIG. 3 is a configuration diagram of a power transmission apparatus for a vehicle according to a second embodiment of the present invention.

Referring to FIG. 3, in a second embodiment of the present invention, a motor/generator MG, which is an auxiliary power source, is additionally disposed to enable driving in a parallel hybrid mode and driving in an electric vehicle (EV) mode, as compared with the first embodiment.

The motor/generator MG serve as a motor and a generator as known, and is configured to include a stator ST fixed to the transmission housing H and a rotor RT rotatably supported inside the stator ST in a radial direction.

The motor/generator MG is disposed between the engine ENG and the planetary gear set PG, such that the rotor RT is fixedly connected to the first input shaft IS1, an engine clutch ECL is disposed between the first input shaft IS1 and an output side of the engine ENG.

Therefore, when a driver is to drive the vehicle by the torque of the engine ENG, the engine clutch ECL is controlled to be operated. In this case, the motor/generator MG enables the driving in the parallel hybrid mode through a torque assist.

In addition, when the driver is to drive the vehicle in the EV mode by a torque of the motor/generator MG, the vehicle may be driven by only the torque of the motor/generator MG in a state in which an operation of the engine clutch ECL is released.

FIG. 4 is a shift operation table of the power transmission apparatus for a vehicle according to a second embodiment of the present invention, and shift processes will be described with reference to FIG. 4.

Referring to FIG. 4, in a second embodiment of the present invention, the engine clutch ECL is operated in fixed shift stages of forward six speeds and reverse one speed by driving of the engine ENG, such that the same shift processes as those of the first embodiment are performed, and a detailed description therefor will be omitted. In this case, torque assist driving by the motor/generator MG is enabled, such that the vehicle may be driven in the parallel hybrid mode.

In addition, in the EV mode, a power source is changed from the engine ENG into the motor/generator MG, but shift processes of forward six speeds and reverse one speed are the same as those of the first embodiment, and a detailed description therefor will thus be omitted.

Figure 5:
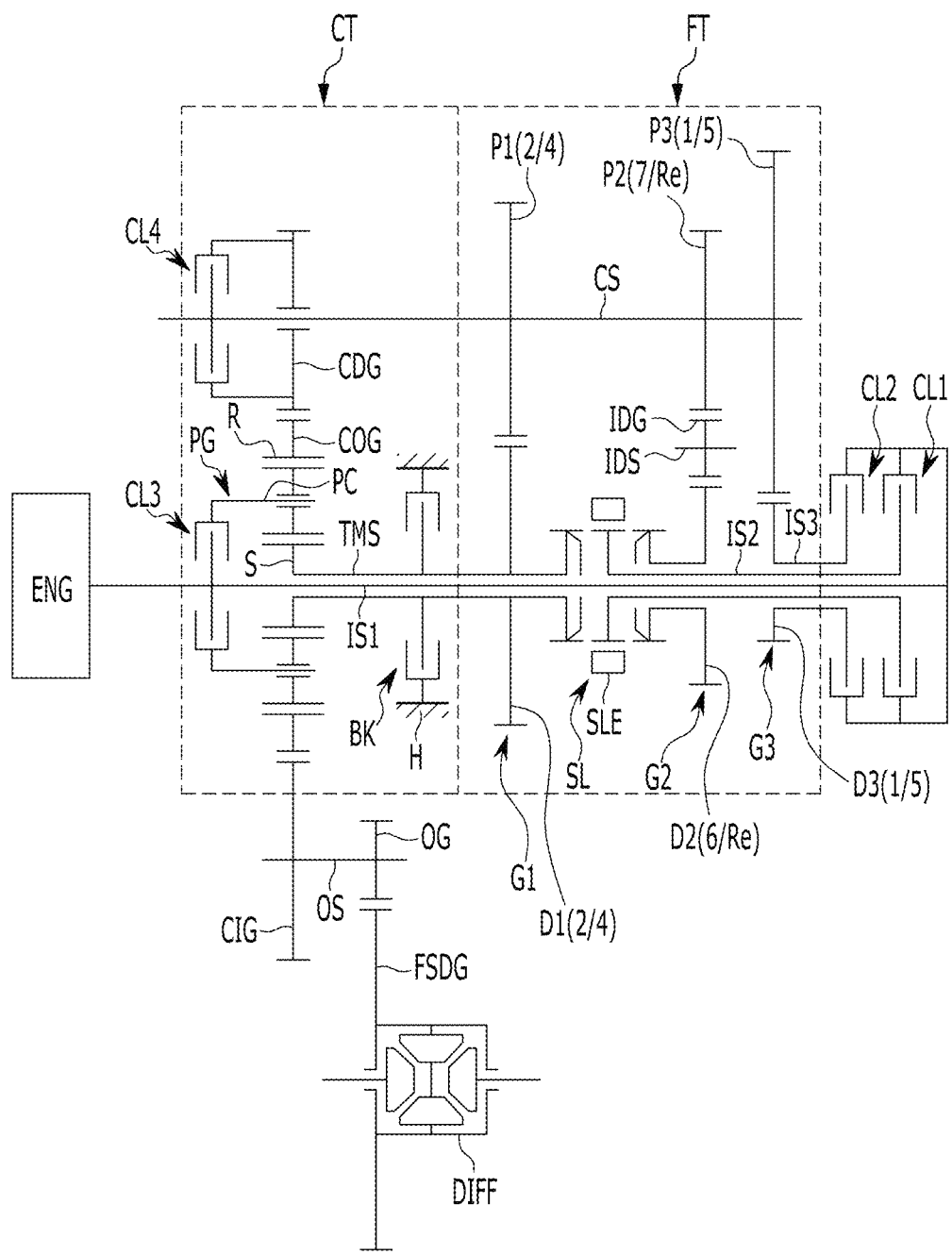
FIG. 5 is a configuration diagram of a power transmission apparatus for a vehicle according to a third embodiment of the present invention.

FIG. 5 is a configuration diagram of a power transmission apparatus for a vehicle according to a third embodiment of the present invention.

Referring to FIG. 5, in a third embodiment of the present invention, shift stages of forward seven speeds and reverse one speed may be implemented by selectively connecting the transmitting shaft TMS to the transmission housing H through a first brake BK, as compared with the first embodiment.

Therefore, the power transmission apparatus for a vehicle according to a third embodiment of the present invention is different from the power transmission apparatus in the first embodiment of the present invention in that the first brake BK is added and the second drive gear D2 and the second driven gear P2 are changed into a 6-speed/reverse drive and driven gear 6/Re and a 7-speed/reverse drive and driven gear 7/Re.

FIG. 6 is a shift operation table of the power transmission apparatus for a vehicle according to a third embodiment of the present invention, and shift processes will be described with reference to FIG. 6.

[Reverse]

In a reverse shift stage REV, as shown in FIG. 6, the second drive gear D2 and the second input shaft IS2 are synchronously connected to each other through the sleeve SLE of the synchronizer SL, and the first clutch CL1 and the fourth clutch CL4 are operated.

Therefore, the torque of engine ENG is output to the final reduction gear FSDG of the differential DIFF through the first input shaft IS1, the first clutch CL1, the second input shaft IS2, the second drive gear D2, the idle gear IDG, the second driven gear P2, the central shaft CS, the fourth clutch CL4, the central drive gear CDG, the central output gear COG, the central input gear CIG, the output shaft OS, and the final output gear OG in a reverse rotation direction, such that reverse driving is performed.

[Forward 1-Speed]

In forward 1-speed FD1, as shown in FIG. 6, the second clutch CL2 and the fourth clutch CL4 are operated in a state in which the sleeve SLE of the synchronizer SL is put in a neutral position.

Therefore, the torque of engine ENG is transferred to the final reduction gear FSDG of the differential DIFF through the first input shaft IS1, the second clutch CL2, the third input shaft IS3, the third drive gear D3, the third driven gear P3, the central shaft CS, the fourth clutch CL4, the central drive gear CDG, the central output gear COG, the central input gear CIG, the output shaft OS, and the final output gear OG, such that forward 1-speed driving is performed.

[Forward 2-Speed]

In forward 2-speed FD2, as shown in FIG. 6, the first drive gear D1 and the second input shaft 152 are synchronously connected to each other through the sleeve SLE of the synchronizer SL, and the first clutch CL1 and the fourth clutch CL4 are operated.

Therefore, the torque of engine ENG is transferred to the final reduction gear FSDG of the differential DIFF through the first input shaft IS1, the first clutch CL1, the second input shaft 152, the first drive gear D1, the first driven gear P1, the central shaft CS, the fourth clutch CL4, the central drive gear CDG, the central output gear COG, the central input gear CIG, the output shaft OS, and the final output gear OG, such that forward 2-speed driving is performed.

[Forward 3-Speed]

In forward 3-speed FD3, as shown in FIG. 6, the third clutch CL3 and the fourth clutch CL4 are operated in a state in which the sleeve SLE of the synchronizer SL is put in a neutral position.

Therefore, the central drive gear CDG and the central shaft CS are synchronously connected to each other by the operation of the fourth clutch CL4 in a state in which the torque of the engine ENG is directly input the planetary carrier PC of the planetary gear set PG constituting the composite transmission CT through the first input shaft IS1 and the third clutch CL3.

In this case, in the planetary gear set PG, in a state in which the torque of the engine is input to the planetary carrier PC, the torques are complementarily operated and compositely output depending on a gear ratio between the central output gear COG and the central drive gear CDG and a gear ratio between the first drive gear D1 and the first driven gear P1, and are then transferred to the final reduction gear FSDG of the differential DIFF through the final output gear OG of the output shaft OS, such that forward 3-speed driving is performed.

[Forward 4-Speed]

In forward 4-speed FD4, as shown in FIG. 6, the first drive gear D1 and the second input shaft IS2 are synchronously connected to each other through the sleeve SLE of the synchronizer SL, and the first clutch CL1 and the third clutch CL3 are operated.

Therefore, some of the torque of the engine ENG is input to the sun gear S of the planetary gear set PG through the first input shaft IS1, the first clutch CL1, the second input shaft IS2, the first drive gear D1, the transmitting shaft TMS, and the other of the torque of the engine ENG is input to the planetary carrier PC of the planetary gear set PG through the first input shaft IS1 and the third clutch CL3.

In this case, the entire planetary gear set PG becomes a state in which it integrally rotates. Therefore, the input torque is output to the central output gear COG as it is, and is then transferred to the final reduction gear FSDG of the differential DIFF through the central input gear CIG, the output shaft OS, and the final output gear OG, such that forward 4-speed driving is performed.

[Forward 5-Speed]

In forward 5-speed FDS, as shown in FIG. 6, the second clutch CL2 and the third clutch CL3 are operated in a state in which the sleeve SLE of the synchronizer SL is put in a neutral position.

Therefore, some of the torque of the engine ENG is reduced through the first input shaft IS1, the second clutch CL2, the third input shaft IS3, the third drive gear D3, the third driven gear P3, the central shaft CS, the first driven gear P1, the first drive gear D1, and the transmitting shaft TMS and is then input to the sun gear S of the planetary gear set PG constituting the composite transmission CT, and the other of the torque of the engine ENG is directly input to the planetary carrier PC of the planetary gear set PG constituting the composite transmission CT through the first input shaft IS1 and the third clutch CL3.

In this case, in the planetary gear set SG of the composite transmission CT, since the torques having different rotation speeds are input to the sun gear S and the planetary carrier PC, the torque is shifted to be increased depending on a difference between the rotation speeds, and is then output to the final reduction gear FSDG of the differential DIFF through the central output gear COG formed integrally with the ring gear R, the central input gear CIG, the output shaft OS, and the final output gear OG, such that forward 5-speed driving is performed.

[Forward 6-Speed]

In forward 6-speed FD6, as shown in FIG. 6, the third clutch CL3 and the first brake BK are operated in a state in which the sleeve SLE of the synchronizer SL is put in a neutral position.

Therefore, in the planetary gear set SG, in a state in which the torque of the engine is directly input the planetary carrier PC by the operation of the third clutch CL3, the sun gear S is operated as a fixed element by the operation of the first brake BK. Therefore, the torque is shifted to be increased, and is then output to the final reduction gear FSDG of the differential DIFF through the central output gear COG formed integrally with the ring gear R, the central input gear CIG, the output shaft OS, and the final output gear OG, such that forward 6-speed driving is performed.

[Forward 7-Speed]

In forward 7-speed FD7, as shown in FIG. 6, the second drive gear D2 and the second input shaft IS2 are synchronously connected to each other through the sleeve SLE of the synchronizer SL, and the first clutch CL1 and the third clutch CL3 are operated.

Therefore, some of the torque of the engine ENG passes through the first clutch CL1, the second input shaft IS2, the second drive gear D2, the idle gear(IDG), and the second driven gear P2 and then rotates the central shaft CS in a forward rotation direction, the torque rotating the central shaft CS in the forward rotation direction is input the sun gear S of the planetary gear set PG constituting the composite transmission CT through the first driven gear P1 and the first drive gear D1 in a reverse rotation direction, and the other of the torque of the engine ENG is directly input to the planetary carrier PC of the planetary gear set PG constituting the composite transmission CT through the first input shaft IS1 and the third clutch CL3 in the forward rotation direction.

In this case, in the planetary gear set PG of the composite transmission CT, the torque is shifted to be significantly increased by the sun gear S rotating in the reverse rotation direction and the planetary carrier PC rotating in the forward rotation direction, and is then output to the final reduction gear FSDG of the differential DIFF through the central output gear COG formed integrally with the ring gear R, the central input gear CIG, the output shaft OS, and the final output gear OG, such that forward 7-speed driving, which is the highest forward shift stage, is performed.

In the power transmission apparatus for a vehicle according to the third embodiment of the present invention, shift processes of forward 1-speed to 5-speed are the same as those of the first embodiment, and a new shift process of forward 6-speed is added, such that forward 6-speed of the first embodiment is changed into forward 7-speed, thereby making it possible to improve shift stages of forward seven speeds and reverse one speed.

Figure 7:
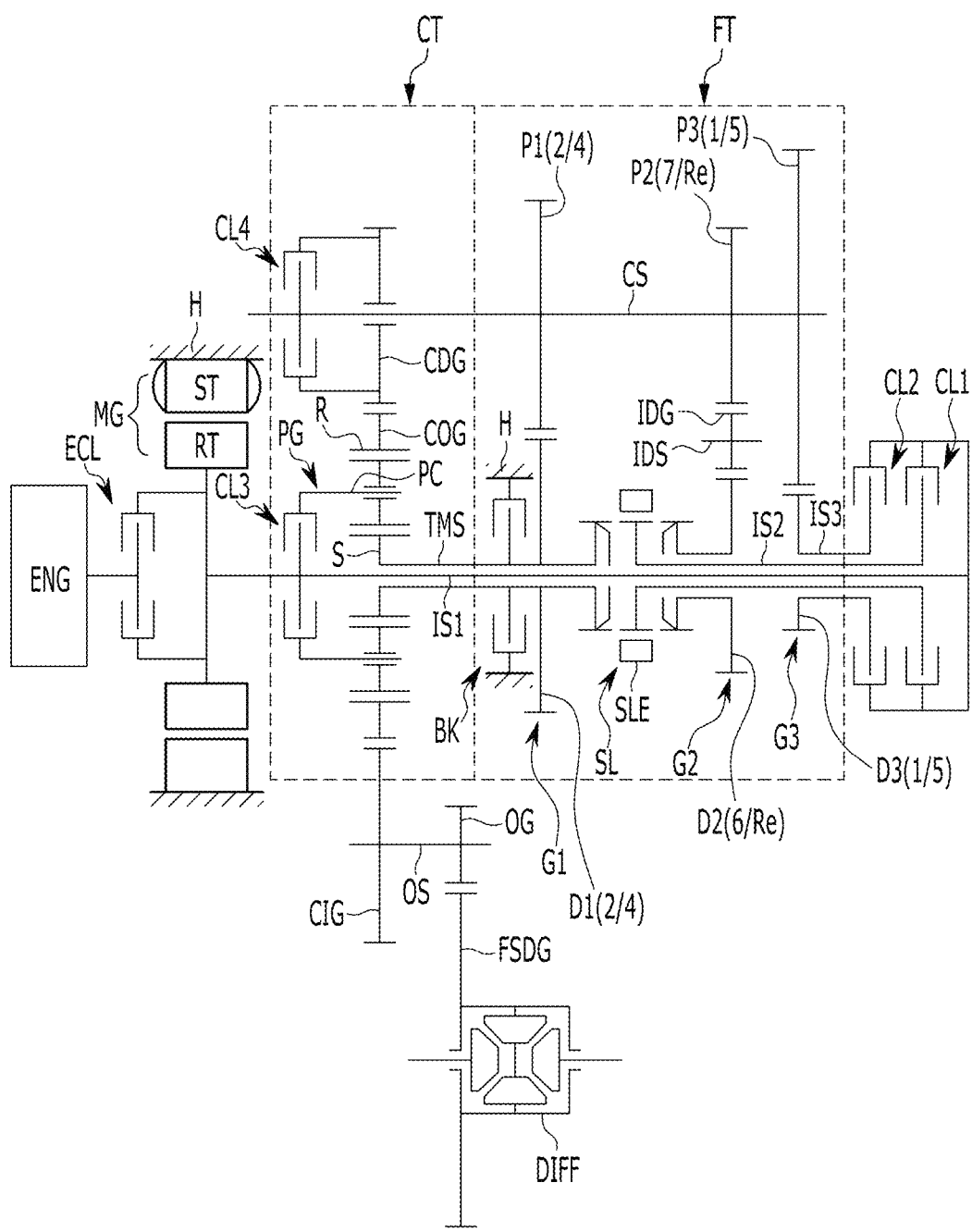
FIG. 7 is a configuration diagram of a power transmission apparatus for a vehicle according to a fourth embodiment of the present invention.

FIG. 7 is a configuration diagram of a power transmission apparatus for a vehicle according to a fourth embodiment of the present invention.

Referring to FIG. 7, in a fourth embodiment of the present invention, a motor/generator MG, which is an auxiliary power source, is additionally disposed to enable driving in a parallel hybrid mode and driving in an electric vehicle (EV) mode, as compared with the third embodiment.

The motor/generator MG serve as a motor and a generator as known, and is configured to include a stator ST fixed to the transmission housing H and a rotor RT rotatably supported inside the stator ST in a radial direction.

The motor/generator MG is disposed between the engine ENG and the planetary gear set PG, such that the rotor RT is fixedly connected to the first input shaft IS1, an engine clutch ECL is disposed between the first input shaft IS1 and an output side of the engine ENG.

Therefore, when a driver is to drive the vehicle by the torque of the engine ENG, the engine clutch ECL is controlled to be operated. In this case, the motor/generator MG enables the driving in the parallel hybrid mode through a torque assist.

In addition, when the driver is to drive the vehicle in the EV mode by a torque of the motor/generator MG, the vehicle may be driven by only the torque of the motor/generator MG in a state in which an operation of the engine clutch ECL is released.

FIG. 8 is a shift operation table of the power transmission apparatus for a vehicle according to a fourth embodiment of the present invention, and shift processes will be described with reference to FIG. 8.

Referring to FIG. 8, in a fourth embodiment of the present invention, the engine clutch ECL is operated in fixed shift stages of forward seven speeds and reverse one speed by driving of the engine ENG, such that the same shift processes as those of the third embodiment are performed, and a detailed description therefor will be omitted. In this case, torque assist driving by the motor/generator MG is enabled, such that the vehicle may be driven in the parallel hybrid mode.

In addition, in the EV mode, a power source is changed from the engine ENG into the motor/generator MG, but shift processes of forward seven speeds and reverse one speed are the same as those of the third embodiment, and a detailed description therefor will thus be omitted.

As described above, in the power transmission apparatus for a vehicle according to an embodiment of the present invention, forward shift stages of at least six or more speeds and a shift stage of reverse one speed may be implemented using one synchronizer SL and one planetary gear set PG, such that more shift stages may be realized to improve fuel consumption.

Further, in an embodiment of the present invention, only one synchronizer is used, such that an internal configuration may be simplified through a reduction in the number of components, fuel consumption may be improved through minimization of a weight, and mountability may be improved through a reduction in a volume.

In addition, the power transmission apparatus for a vehicle according to an embodiment of the present invention, one motor/generator is additionally disposed in a basic configuration to enable the driving in the EV mode and the parallel hybrid mode.

While this invention has been described in connection with certain embodiments, it is to be understood that the invention is not limited to the disclosed embodiments, but, on the contrary, is intended to cover various modifications and equivalent arrangements included within the spirit and scope of the appended claims.

What is claimed is:

1. A power transmission apparatus for a vehicle, comprising:
    a first input shaft fixedly connected to an output side of an engine;
    a second input shaft formed of a hollow shaft, disposed on an outer circumference of the first input shaft without rotation interference to overlap the first input shaft, and selectively connected to the first input shaft through a first clutch;
    a third input shaft formed of a hollow shaft, disposed on an outer circumference of the second input shaft without rotation interference to overlap the second input shaft, and selectively connected to the first input shaft through a second clutch;
    a transmitting shaft disposed on the peripheral circumference of the first input shaft without rotation interference to correspond to a front side of the second input shaft;
    a central shaft disposed in parallel with the first input shaft in a state in which the central shaft is spaced apart from the first input shaft by a predetermined interval;
    a fixed transmission selectively shifting an input torque depending on the respective gear ratios of three change gear trains disposed between the second and third input shafts, the transmitting shaft, and the central shaft and each having drive gears and driven gears externally connected to each other and outputting the shifted torque through the central shaft and the transmitting shaft;
    a composite transmission including one planetary gear set having a sun gear fixedly connected to one side of the transmitting shaft, a planetary carrier selectively connected to the first input shaft connected through a third clutch, and a ring gear selectively connected to the central shaft to shift input torques and output the shifted torque; and
    an output shaft disposed in parallel with the first input shaft in a state in which the output shaft is spaced apart from the first input shaft by a predetermined interval and outputting the torque transferred from the composite transmission to a final reduction gear.

2. The power transmission apparatus for a vehicle of claim 1, wherein:

the first and second clutches, the fixed transmission, and the composite transmission are disposed in a sequence of the composite transmission, the fixed transmission, the second clutch, and the first clutch behind the engine.

3. The power transmission apparatus for a vehicle of claim 1, wherein:

the three change gear trains include:

a first change gear train including a first drive gear fixedly connected to the transmitting shaft and a first driven gear fixedly connected to the central shaft and externally connected to the first drive gear;

a second change gear train including a second drive gear disposed on the outer circumference of the second input shaft without rotation interference, a second driven gear fixedly connected to the central shaft, and an idle gear externally connecting the second drive gear and the second driven gear to each other; and a third change gear train including a third drive gear fixedly connected to the third input shaft and a third driven gear fixedly connected to the central shaft and externally connected to the third drive gear.

4. The power transmission apparatus for a vehicle of claim 3, wherein:

the first drive gear and the second drive gear are selectively synchronously connected to the second input shaft by a synchronizer.

5. The power transmission apparatus for a vehicle of claim 3, wherein:

the first change gear train has a gear ratio for forward 2-speed and 4-speed, the second change gear train has a gear ratio for forward 6-speed and reverse, and the third change gear train has a gear ratio for forward 1-speed and 5-speed.

6. The power transmission apparatus for a vehicle of claim 1, wherein:

in the composite transmission, the sun gear of the planetary gear set is fixedly connected to the transmitting shaft, the planetary carrier gear of the planetary gear set is selectively connected to the first input shaft, and the ring gear of the planetary gear set has a central output gear integrally therewith on an outer circumference thereof, and the central output gear is externally connected between a central drive gear disposed on the central shaft without rotation interference and selectively connected to the central shaft through a fourth clutch and a central input gear on the output shaft.

7. The power transmission apparatus for a vehicle of claim 6, wherein:

the composite transmission outputs a torque selectively transferred through the central drive gear on the central shaft to the central input gear on the output shaft through the central output gear on the ring gear at it is, and shifts a torque selectively input from the first input shaft to the planetary carrier and the torque shifted from the fixed transmission and input to the sun gear through the transmitting shaft and outputs the shifted torque to the central input gear on the output shaft through the central output gear.

8. The power transmission apparatus for a vehicle of claim 6, wherein:

the planetary gear set is a single pinion planetary gear set.

9. The power transmission apparatus for a vehicle of claim 1, wherein:

a motor/generator is connected to the first input shaft in series, and is selectively connected to the output side of the engine through an engine clutch.

10. The power transmission apparatus for a vehicle of claim 1, wherein:

the transmitting shaft is selectively connected to a transmission housing through a brake.

11. The power transmission apparatus for a vehicle of claim 10, wherein:

the first change gear train has a gear ratio for forward 2-speed and 4-speed, the second change gear train has a gear ratio for forward 7-speed and reverse, and the third change gear train has a gear ratio for forward 1-speed and 5-speed.

12. The power transmission apparatus for a vehicle of claim 10, wherein:

a motor/generator is connected to the first input shaft in series, and is selectively connected to the output side of the engine through an engine clutch.

* * * * *